(12) United States Patent  (10) Patent No.: US 8,884,530 B2
Lee  (45) Date of Patent: Nov. 11, 2014

(54) INTELLIGENT ILLUMINATING DEVICE

(71) Applicant: Wen-Sung Lee, Taichung (TW)

(72) Inventor: Wen-Sung Lee, Taichung (TW)

( * ) Notice: Subject to any disclaimer, the term of this patent is extended or adjusted under 35 U.S.C. 154(b) by 130 days.

(21) Appl. No.: 13/762,308

(22) Filed: Feb. 7, 2013

(65) Prior Publication Data

US 2014/0217904 A1  Aug. 7, 2014

(51) Int. Cl.
*H05B 37/02* (2006.01)
*H05B 39/04* (2006.01)
*H05B 41/36* (2006.01)

(52) U.S. Cl.
CPC ..................... *H05B 37/02* (2013.01)
USPC ............................ 315/153; 315/152; 315/312

(58) Field of Classification Search
CPC .. H05B 37/029; H05B 37/02; H05B 37/0218; H05B 33/0869; F21V 23/0442; G05B 11/017
USPC .................................. 315/153, 312
See application file for complete search history.

(56) References Cited

U.S. PATENT DOCUMENTS

| 8,319,441 | B2 * | 11/2012 | Chao ............................ | 315/156 |
| 8,328,385 | B2 * | 12/2012 | Catalano et al. .............. | 362/202 |
| 2008/0129211 | A1 * | 6/2008 | Lin et al. ....................... | 315/151 |
| 2010/0148674 | A1 * | 6/2010 | Braun et al. .................. | 315/149 |
| 2010/0171442 | A1 * | 7/2010 | Draper et al. ................. | 315/297 |
| 2012/0262069 | A1 * | 10/2012 | Reed ............................ | 315/130 |
| 2012/0306389 | A1 * | 12/2012 | Shteynberg et al. ......... | 315/186 |
| 2013/0214699 | A1 * | 8/2013 | Jonsson ....................... | 315/297 |
| 2014/0152188 | A1 * | 6/2014 | Bora et al. .................... | 315/210 |

* cited by examiner

*Primary Examiner* — Dylan White

(57) ABSTRACT

An intelligent illuminating device includes at least one lamp being installable onto an object, the lamp having at least one light emitting unit and at least one light collecting unit, a light beam of the light emitting unit being projected out as the lamp turned on, the light collecting unit corresponding to a targeted region, each light collecting unit having a MCU and a PWM unit. Under this arrangement, when the light collecting unit acquires the brightness value of the targeted region, the brightness value is transmitted to the MCU and compared with a predetermined brightness value, so that a difference value is obtained and transmitted to the PWM unit; hence, the light emitting unit is controlled by the PWM unit to project a light beam with a designated intensity.

7 Claims, 5 Drawing Sheets

INTELLIGENT ILLUMINATING DEVICE

BACKGROUND OF THE INVENTION

1. Field of the Invention

The present invention relates to an illuminating device, and more particularly to an intelligent illuminating device in which the light intensity is adjustable according to the brightness level within a designated region so as to provide different illuminating conditions according to user's requirements.

2. Description of Related Art

A conventional power saving lamp comprises a lamp having a CPU (central processing unit), a photoresistor and an infrared sensing unit. The photoresistor couples with the CPU and detects the luminous flux of the environment. The infrared sensing unit couples with the CPU and detects the motions of human beings. Under this arrangement, the photoresistor and the infrared sensing unit can work individually or combinatively; when the infrared sensing unit detects the motions of human beings, a signal is generated and transmitted to the CPU, so that the brightness level of the lamp is adjusted according to the motions of human beings; similarly, when the photoresistor detects the luminous flux of the environment, another signal is generated and transmitted to the CPU, so that the brightness level of the lamp is adjusted for compensating the difference between the luminous flux of the environment and a designated luminous flux.

However, the conventional power saving lamp has several disadvantages.

Firstly, the photoresistor can only universally detect the luminous flux of the environment and cannot detect the luminous flux in a certain orientation corresponding to the photoresistor, so that the applicability of the conventional power saving lamp is serious reduced. Secondly, as mentioned above, because the detection direction of the photoresistor is universal, namely, lacking of directionality, the conventional power saving lamp provides an uneven illuminating condition for a given region.

Thirdly, when a plurality of conventional power saving lamps is applied at the same region, the brightness level of each said lamp cannot be adjusted according to the brightness level of other lamps, so that the brightness level of the region would be excess or insufficient.

Fourthly, in the house, three activity areas are generally defined according to the frequency of activities: a major activity area, a minor activity area and a least activity area. Generally, the requirements for the brightness level of the three areas are different, and the major activity area needs the highest brightness level and the least activity area needs the lowest brightness level. Transitional areas are defined between each two activity areas However, the conventional power saving lamp fails to offer an appropriate illumination level for each area because the photoresistor lacks of directionality; in addition, the brightness level of the transitional areas cannot be adjusted, too; therefore, a brightness difference is undoubtedly existed between the transitional areas and said three activity areas.

Further, to meet the environmental friendly issue, the conventional power saving lamp can be assembled with a solar cell which stores and coverts the sun light into electricity; however, the efficiency of the sun light storage of the solar cell depends on the weather; as mentioned above, because of the lack of directionality of the photoresistor, the brightness level of the conventional power saving lamp cannot be adjusted according to the surrounding environment, so that the conventional power saving lamp wastes a lot of electricity.

The present invention has arisen to mitigate and/or obviate the disadvantages of the conventional.

SUMMARY OF THE INVENTION

The main objective of the present invention is to provide an intelligent illuminating device.

To achieve the objective, an intelligent illuminating device comprises at least one lamp which is installable onto an object, the lamp having at least one light emitting unit and at least one light collecting unit defined therein, a light beam of the light emitting unit being projected out from the lamp toward a direction so as to form an illuminated region when the lamp is turned on, the light collecting unit corresponding to a targeted region outside the lamp, each light collecting unit having a MCU and a PWM unit. Wherein, the light collecting unit further has a differential amplifying unit and an A/D converter unit; the differential amplifying unit acquires the brightness value of the targeted region so as to generate a signal, wherein the signal is amplified by the differential amplifying unit so as to be transmitted to the A/D converter unit; the format of the signal is converted by the A/D converter unit from an analog format to a digital format so as to be transmitted to the MCU for calculation; when the illuminated regions from different lamps 1 overlap with each other so as to form at least one overlapped illuminated region, collecting directions of the light collecting units of each lamp are adjusted for corresponding to some of the overlapped illuminated regions, and the overlapped illuminated regions are defined as the targeted regions of the present invention; the intensity of the light beam of the light emitting unit of each lamp is adjusted by the MCU according to the brightness value of the targeted region where the light collecting units of each lamp correspond to, wherein the brightness value of the targeted regions are acquired and calculated in a comprehensive manner by the MCUs of the light collecting units, so that the intensity of the light beam of each light emitting unit is determined respectively; the light collecting unit further has a buffering unit; the buffering unit has a predefined buffered time threshold; when the brightness level of the targeted region changes within one time period which is below said predefined buffered time threshold, the light collecting unit commands the light emitting unit not to start the adjustment of the intensity of the lamp via the MCU and the PWM unit; when the brightness level of the targeted region changes in another time period which is above said predefined buffered time threshold, the light collecting unit commands the light emitting unit to start the adjustment of the intensity of the lamp via the MCU and the PWM unit; the lamp has a reflecting curved surface defined therein; the light emitting unit is assembled on an inner surface of the reflecting curved surface, so that the light beam of the light emitting unit is reflected by the reflecting curved surface and is projected out from the lamp toward the direction; the direction of the light beam is adjustable via changing a surface curvature value of the reflecting curved surface; the collecting direction of the light collecting unit is adjustable, so that the position of the targeted region is shifted according to the collecting direction of the light collecting unit; the present invention has a photo sensitive semiconductor unit; the lamp has an adjusting unit connecting with the MCU; the adjusting unit provides a manual adjusting manner of the intensity of the light emitting unit of the lamp, so that the intensity of the light emitting unit is adjusted via the manual adjusting manner.

Under this arrangement, when the light collecting unit acquires the brightness value of the targeted region firstly, the brightness value is transformed into a signal and is transmitted to the MCU for calculation; thereby, the MCU compares the signal with a predetermined brightness value saved in the MCU, so that a difference brightness value between the signal and the predetermined brightness value is obtained; thereafter, the difference brightness value is further transmitted to the PWM unit via a command format, such that the light emitting unit is controlled by the PWM unit so as to project a light beam with a designated intensity which corresponds to said difference value; as a result, the brightness of the targeted region is optimized according to the brightness value of the targeted region.

Further benefits and advantages of the present invention will become apparent after a careful reading of the detailed description with appropriate reference to the accompanying drawings.

DETAILED DESCRIPTION OF THE INVENTION

Figure 1:
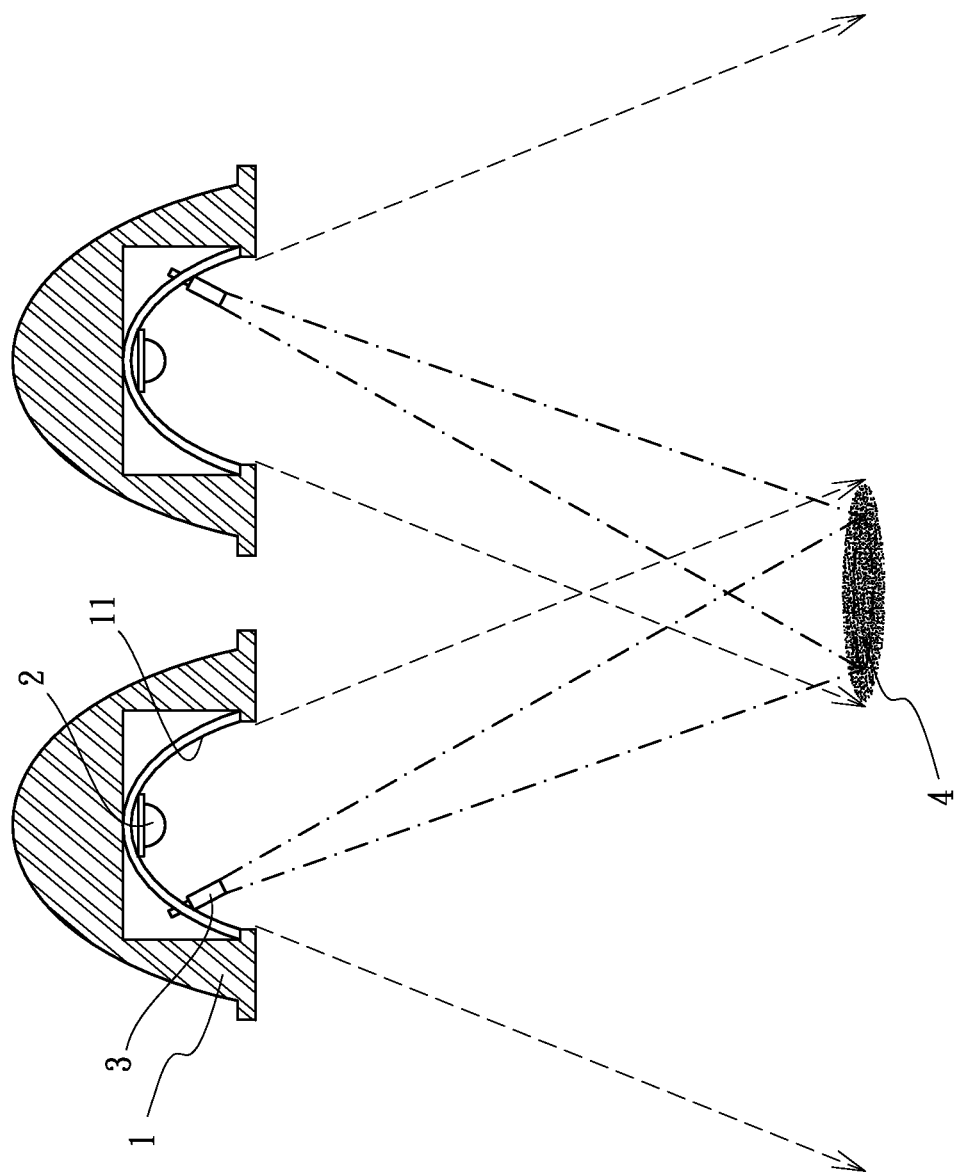
FIG. 1 is a schematic view of an intelligent illuminating device in accordance with the present invention for showing two light beams of two lamps project and light on the same targeted region.
Figure 2:
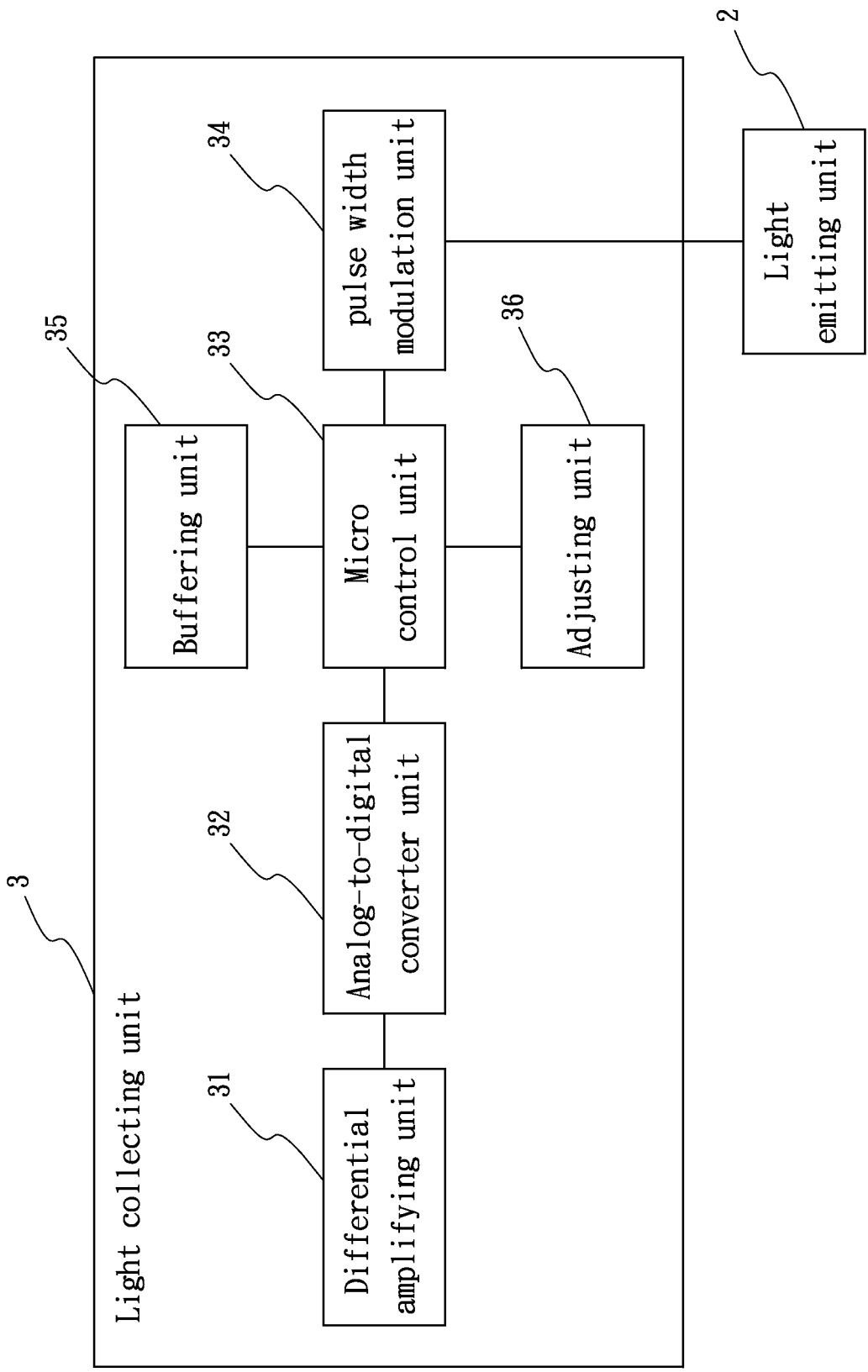
FIG. 2 is a block chart for showing a light-collecting unit is connected to a light emitting unit.

Referring to FIGS. 1-2, an intelligent illuminating device in accordance with one embodiment of the present invention comprises at least one lamp 1 which is installable onto an object, such as a wall or a ceiling of a house. The lamp 1 could be a table lamp, a daylight lamp, a street lamp or other types of lamps (The types of the lamps 1 are not limited by the present invention.). The lamp 1 has at least one light emitting unit 2 and at least one light collecting unit 3 defined therein.

When the lamp 1 is turned on, a light beam of the light emitting unit 2 is projected out from the lamp 1 toward a direction so as to form an illuminated region. The light collecting unit 3 corresponds to a targeted region 4 outside the lamp 1 so as to acquire a brightness value of the targeted region 4. As shown in FIG. 1, the lamp 1 is assembled to a ceiling of a house (not shown) and having a reflecting curved surface 11 defined therein. The light emitting unit 2 and the light collecting unit 3 are assembled on an inner surface of the reflecting curved surface 11, so that the light beam of the light emitting unit 2 is reflected by the reflecting curved surface 11 and is projected out from the lamp 1 toward the direction. The direction of the light beam is adjustable via changing a surface curvature value of the reflecting curved surface 11. As shown in FIG. 1, the targeted region 4 is defined as the overlapped illuminated regions of the at least two lamps 1. A collecting direction of the light collecting unit 3 is adjustable (e.g. the collecting direction of the light collecting unit 3 is adjusted via a mechanical manner or a manual operated manner), so that the position of the targeted region 4 is shifted according to the collecting direction of the light collecting unit 3. Specifically, when each lamp 1 has a plurality of light collecting units 3 disposed therein, the light collecting units 3 optionally correspond to the same targeted region 4 or to different targeted regions 4 via a combinative manner or an individual manner of the light collecting units 3, so that the size, the position and the number of the targeted regions 4 are adjustable so as to meet user's requirements.

In addition, each light collecting unit 3 has a Micro control unit 33 (MCU 33, which is one kind of the micro processing units) and a Pulse Width Modulation unit 34 (PWM unit 34, technological details about the PWM unit 34 are known so as to be omitted.). The light collecting unit 3 further has a differential amplifying unit 31 (the purpose of the differential amplifying unit 31 is amplifying a received signal and outputting the amplified signal; technological details about the differential amplifying unit 31 are known so as to be omitted) and an analog-to-digital converter unit 32 (A/D converter unit 32, which is an apparatus for converting continuous analog signals to discrete digital signals.). As shown in FIG. 2, the differential amplifying unit 31 acquires the brightness value of the targeted region 4 so as to generate a signal; and then, said signal is amplified by the differential amplifying unit 31 so as to be transmitted to the A/D converter unit 32; thereby, the format of the signal is converted by the A/D converter unit 32 from an analog format to a digital format so as to be transmitted to the MCU 33 for calculation; thereafter, the MCU 33 compares the signal with a predetermined brightness value saved in the MCU 33 and a difference brightness value between said signal and said predetermined brightness value is obtained and further transmitted to the PWM unit 34 via a command format; as a result, the light emitting unit 2 is controlled by the PWM unit 34 so as to project a light beam with a designated intensity which corresponds to said difference value, so that the brightness of the targeted region 4 is optimized according to the environments.

Moreover, the present invention has a photo sensitive semiconductor unit, and the differential amplifying unit 31 and a light emitting unit 2 constitute the photo sensitive semiconductor unit. Therefore, present invention has the functions of emitting light, receiving light and amplifying light signal. Furthermore, the lamp 1 has an adjusting unit 36 connecting with the MCU 33. The adjusting unit 36 provides a manual adjusting manner of the intensity of the light emitting unit 2 of the lamp 1, so that the intensity of the light emitting unit 2 is optionally adjusted via the MCU 33 or via the manual adjusting manner so as to provide a comfortable lighting performance.

The present invention further has following characteristics.

1. The light collecting unit 3 of one lamp 1 acquires the brightness value of a certain targeted region 4 which has been already lighted by the light beam of the light emitting unit 2 of another lamp 1, so that the intensity of the light beam of one lamp 1 is adjusted according to the brightness value of the certain targeted region 4 so as to provide an uniform illuminating condition for the certain targeted region 4. For example, in order to achieve a predefined brightness value for an area, the light collecting units 3 of the lamps 1 acquire the brightness value of the area firstly; and then, the brightness difference between the predefined brightness value and the brightness value of the area is compensated by the lamps 1 to achieve the predefined brightness; even when some of the lamps 1 are broken, the predefined brightness of the area is achieved by other lamps 1 which work appropriately, so that the brightness value of the area is uniform and constant.

2. When a plurality of lamps 1 is assembled on the wall of the house, and one lamp 1 is assembled near a window, the light collecting units 3 of one lamp 1 correspond to the targeted region 4 via the combinative manner or the individual manner, so that at least one of the targeted regions 4 is defined out of the window; hence, the light collecting units 3 of one lamp 1 near to the window correspond to the targeted region 4 so as to acquire the brightness value of the targeted region 4; thereby, the intensities of the light beam of the light emitting unit 2 near to the window are adjusted so as to provide an uniform brightness level for all targeted regions 4, so that the cost of the electricity is reduced and the safety of the targeted regions 4 is built because of the enough brightness.

3. In the house, three activity areas are generally defined according to the frequency of activities: a major activity area, a minor activity area and a least activity area. Generally, the requirements for the brightness level of the three areas are different, and the major activity area needs the highest brightness level and the least activity area needs the lowest brightness level. Transitional areas are defined between each two activity areas. In order to offer an appropriate illumination according to the requirements of each activity area, the present invention is applied and the collecting direction of the light collecting units 3 is adjusted so as to achieve the requirements of brightness level for said three areas; in addition, the brightness of the transitional areas are adjusted via the light collecting units 3 of the lamps 1, so that the brightness level of each activity area is not extremely different from the neighboring activity area.

Further, when the illuminated regions from different lamps 1 overlap with each other so as to form at least one overlapped illuminated region, the collecting directions of the light collecting units 3 of each lamp 1 are adjusted for corresponding to some of the overlapped regions, and the overlapped illuminated regions are defined as the targeted regions 4 of the present invention. Therefore, for each lamp 1, the intensity of the light beam of the light emitting unit 2 is adjusted by the MCU 33 according to the brightness value of the targeted region 4 where the light collecting units 3 of each lamp 1 correspond to (the brightness value of said targeted region 4 is contributed mostly by the environments and other lamps 1 which light on the targeted region 4). Under this arrangement, the brightness value of the targeted regions 4 are acquired and calculated in a comprehensive manner by the MCUs 33 of the light collecting units 3, so that the intensity of the light beam of each light emitting unit 2 is determined respectively.

Figure 3:
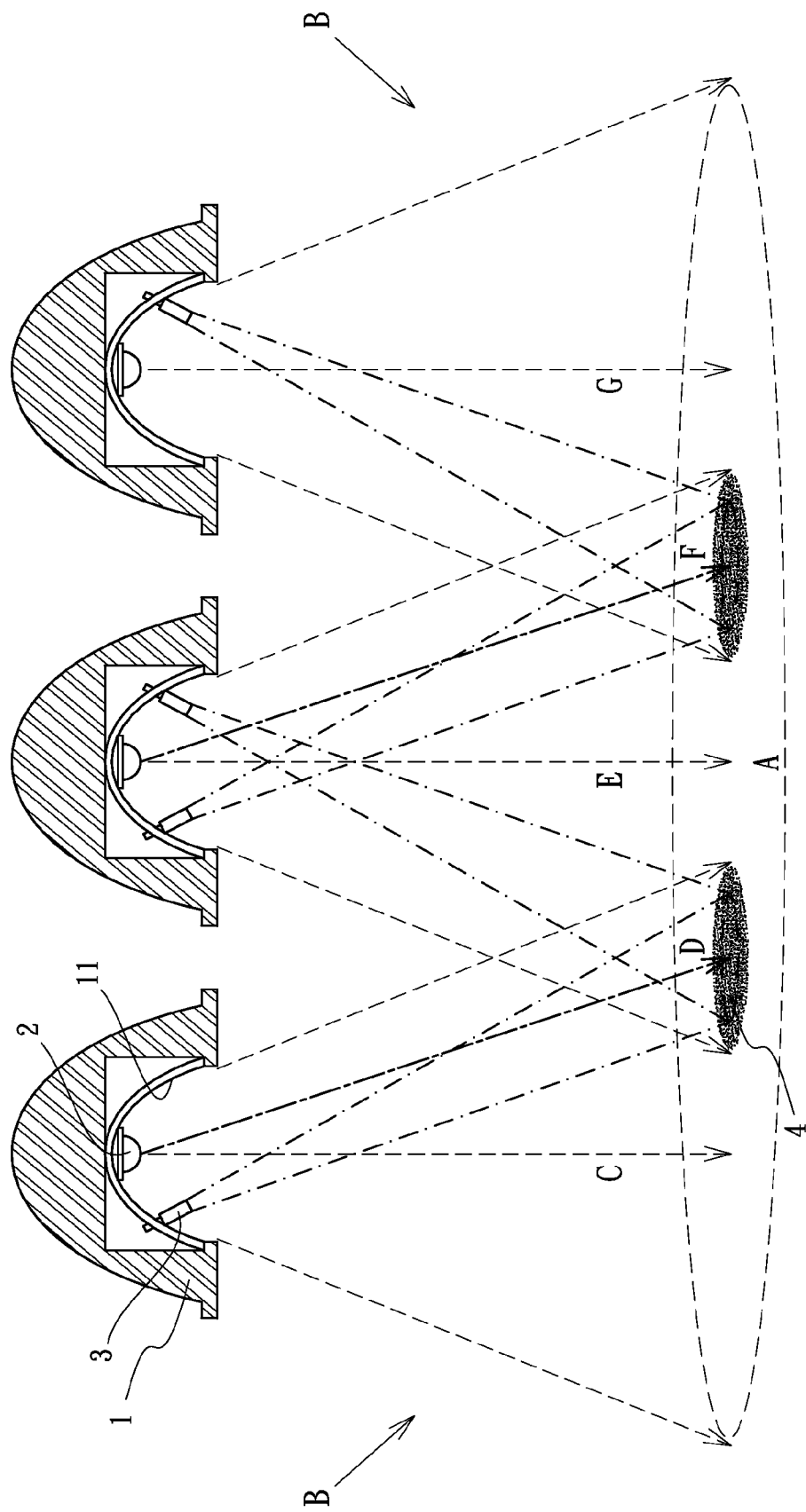
FIG. 3 is a schematic view for showing three light beams of three lamps overlap with each other, so that the targeted regions are lighted by the light beams simultaneously from different lamps.

Referring to FIG. 3, which represents that a plurality of lamps 1 are linearly assembled on a ceiling of another house (not shown). The left lamp 1 (as shown in the left part of FIG. 3) and the right lamp 1 (as shown in the right part of FIG. 3) have one light emitting unit 2 and one light collecting unit 3 respectively. The middle lamp 1 (as shown in the middle part of FIG. 3) has one light emitting unit 1 and two light collecting units 3 (The number of the light emitting units 2 for each lamp 1, the number of the light collecting units 3 for each lamp 1 and the arrangement of the lamps 1 are not restricted by the present invention.). The illuminated region of each lamp 1 overlaps with another illuminated region of each adjacent lamp 1 so as to form a plurality of overlapped illuminated regions. The overlapped illuminated regions are defined as the targeted regions 4, so that the light collecting units 2 of the lamps 1 correspond to the targeted regions 4. The required brightness level for each targeted region 4 is defined as an A value and an environmental brightness level of each targeted region 4, which is contributed by the environment, is defined as a B value. Under this arrangement, the light collecting unit 3 of the left lamp 1 acquires the B value firstly; and then, a command is sent from the light collecting unit 3 of the left lamp 1 to the light emitting unit 2 of the left lamp 1, so that the intensity of the light emitting unit 2 of the left lamp 1 is adjusted as a C value, which is calculated by the equation: A value minus B value (suppose that the A value is larger than the B value); consequently, the light collecting unit 3 of the middle lamp 1 acquires a D value which is contributed by the light emitting unit 2 of the left lamp 1; thereafter, another command is sent from the light collecting units 3 of the middle lamp 1 to the light emitting unit 2 of the middle lamp 1, so that the intensity of the light emitting unit 2 of the middle lamp 1 is adjusted as an E value, which is calculated by the equation: A value minus the summation of B value and D value; similarly, the light collecting unit 3 of the right lamp 1 acquires a F value which is contributed by the light emitting unit 2 of the middle lamp 1; thereafter, a further command is sent from the light collecting unit 3 of the right lamp 1 to the light emitting unit 2 of the right lamp 1, so that the intensity of the light emitting unit 2 of the right lamp 1 is adjusted as a G value, which is calculated by the equation: A value minus the summation of B value and F value. Under this arrangement, a uniform brightness is provided by the present invention. Furthermore, the present invention is installable with a solar cell and adjustable in the intensity in a manner as described above so as to reduce the output electricity of the solar cell and optimize the performance of the solar cell. The value described above is only for explaining the principle about the calculation between the required brightness and the brightness level contributed by the light emitting units 2 of the lamps 1. Wherein when the arrangement of the lamps 1 are changed, said values are varied.

Figure 4:
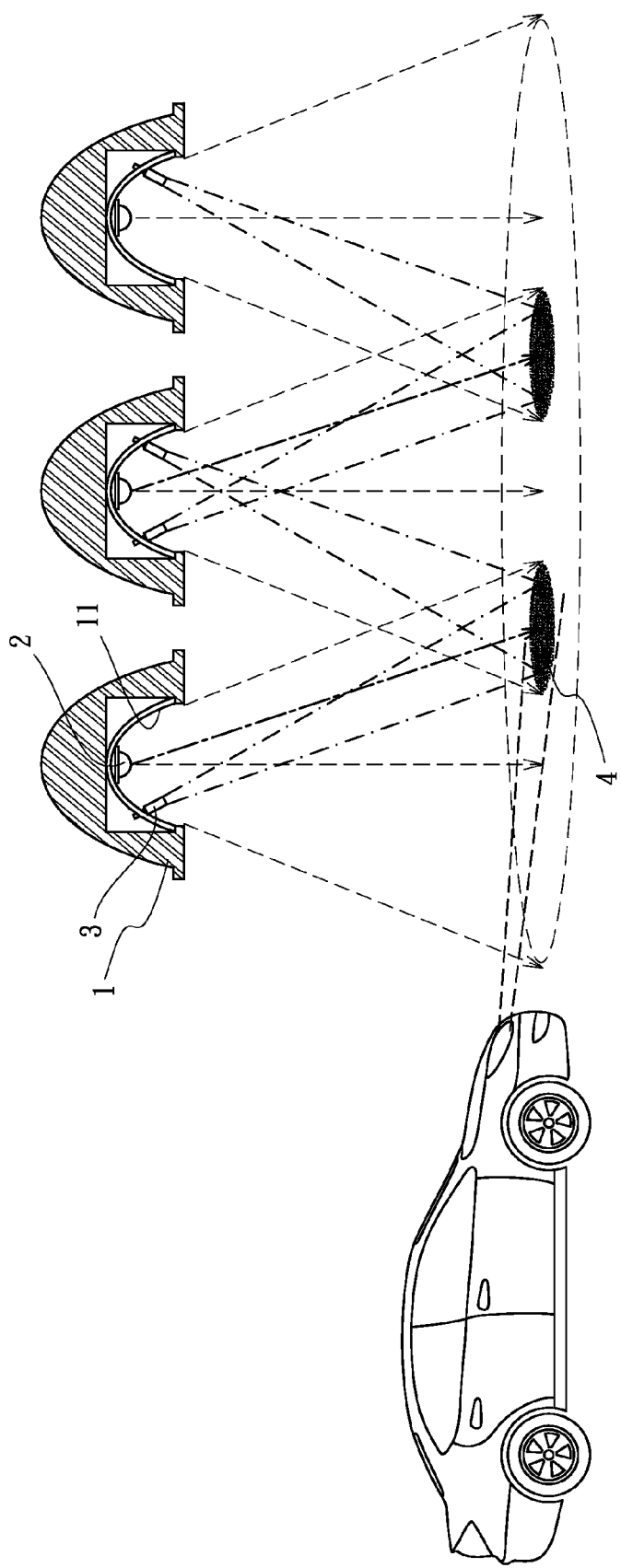
FIG. 4 is a schematic view for showing a vehicle is going to pass through the targeted regions of the lamps.

Referring to FIG. 4, a plurality of lamps 1 are linearly assembled on a side of a road. Under normal condition which no vehicle passing through the road, the intensity of each lamp is set as a default intensity value; when any of vehicles passing through the road, the default intensity of each lamp 1 is adjusted via the light collecting units 3 according to a preset intensity value which is determined and preset according to the road condition. Under this arrangement, when a vehicle passes through the targeted regions 4 of the lamps 1, the light collecting unit 3 of the left lamp 1 acquires the intensity of the light beam from the vehicle so as to send one command to the light emitting unit 2 of the left lamp 1 for adjusting the default intensity of said light emitting unit 2; consequently, when the default intensity of the left lamp 1 is adjusted, the default intensities of the middle lamp 1 and the right lamp 1 are adjusted as mentioned above, so that the lamps 1 provide an appropriate brightness level to a driver of the vehicle for watching the road condition, so that car accidents are prevented. Furthermore, after the vehicle passes through the targeted regions 4 of said lamps 1, the intensities of the lamps 1 are adjusted back to the default intensities so as to reduce the operating electricity.

The light collecting unit 3 further has a buffering unit 35. The buffering unit 35 has a predefined buffered time threshold, when the brightness level of the targeted region 4 changes within one time period which is below said predefined buffered time threshold, the light collecting unit 3 sends a deny command via the MCU 33 and the PWM unit 34 to the light emitting unit 2 so as to cease the adjustment of the intensity of the lamp 1. Under such condition, when the brightness level of the targeted region 4 is temporally changed within one time period which is below said predefined buffered time threshold, the intensity of the light emitting unit 2 is not adjusted so as to prevent the lamp 1 from flashing frequently. Oppositely, when the brightness level of the targeted region 4 changes in another time period which is above said predefined buffered time threshold, the light collecting unit 3 sends an allowance command via the MCU 33 and the PWM unit 34 to the light emitting unit 2 so as to start the adjustment of the intensity of the lamp 1.

Figure 5:
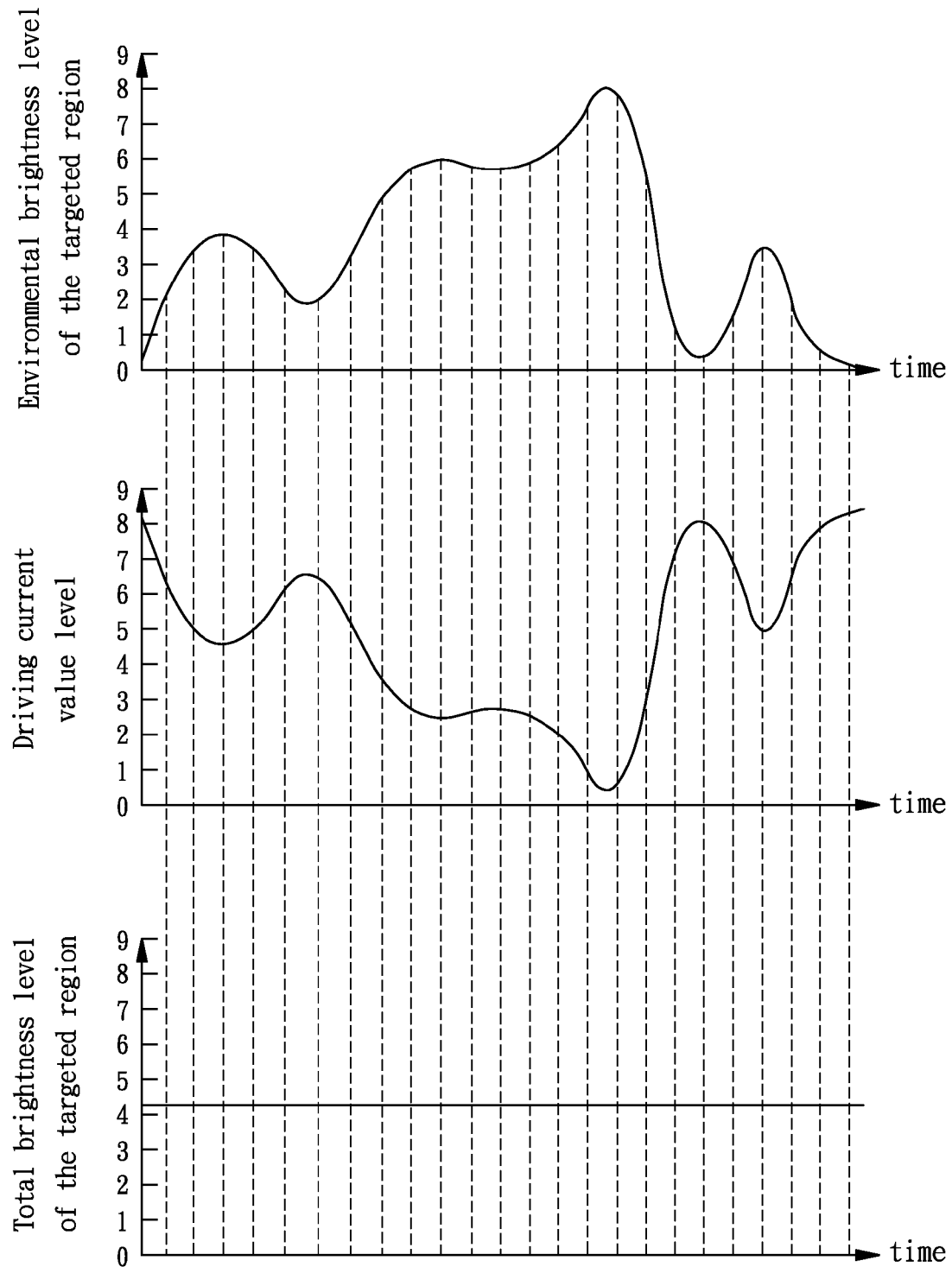
FIG. 5 is a schematic view for showing the relationship between an environmental brightness level of the targeted region and the time, the relationship between a driving current value level of a mechanical apparatus with a power source and the time and the relationship between a total brightness level of the targeted region and the time.

Referring to FIG. 5, which shows the relationship between an environmental brightness level of the targeted region 4 and the time, the relationship between a driving current value level of a mechanical apparatus with a power source (not shown) and the time and the relationship between a total brightness level of the targeted region 4 and the time, wherein the environmental brightness level of the targeted region 4 is defined as the brightness level which is contributed by the environment; when the present invention is assembled to a mechanical apparatuses with a power source, a driving current value, given by the power source, is applied to the present invention and defined as the driving current value level; the total brightness level of the targeted region 4 is defined as the brightness level which is contributed by the environment and the present invention simultaneously. As shown in FIG. 5, when the environmental brightness level of the target region 4 is lower, the intensity of the light emitting unit 2 rises for compensation, so that the driving current value level increases, too; therefore, the total brightness level of the targeted region 4 is retained as a constant value which meets user's requirements.

Although the invention has been explained in relation to its preferred embodiment, it is to be understood that many other possible modifications and variations can be made without departing from the spirit and scope of the invention as hereinafter claimed.

What is claimed is:

1. An intelligent illuminating device comprising:
    at least one lamp which is installable onto an object, the lamp having at least one light emitting unit and at least one light collecting unit defined therein;
    a light beam of the light emitting unit being projected out from the lamp toward a direction so as to form an illuminated region when the lamp is turned on, the light collecting unit corresponding to a targeted region outside the lamp; and
    each light collecting unit having a MCU and a PWM unit;
    wherein when the light collecting unit acquires the brightness value of the targeted region firstly, the brightness value is transformed into a signal and is transmitted to the MCU for calculation; thereby, the MCU compares the signal with a predetermined brightness value saved in the MCU, so that a difference brightness value between the signal and the predetermined brightness value is obtained; thereafter, the difference brightness value is further transmitted to the PWM unit via a command format, such that the light emitting unit is controlled by the PWM unit so as to project a light beam with a designated intensity which corresponds to said difference value; as a result, the brightness of the targeted region is optimized according to the brightness value of the targeted region; and
    wherein the light collecting unit further has a differential amplifying unit and an A/D converter unit; the differential amplifying unit acquires the brightness value of the targeted region so as to generate a signal, wherein the signal is amplified by the differential amplifying unit so as to be transmitted to the A/D converter unit; the format of the signal is converted by the A/D converter unit from an analog format to a digital format so as to be transmitted to the MCU for calculation.

2. The intelligent illuminating device as claimed in claim 1, wherein when the illuminated regions from different lamps overlap with each other so as to form at least one overlapped illuminated region, collecting directions of the light collecting units of each lamp are adjusted for corresponding to some of the overlapped illuminated regions, and the overlapped illuminated regions are defined as the targeted regions of the present invention; the intensity of the light beam of the light emitting unit of each lamp is adjusted by the MCU according to the brightness value of the targeted region where the light collecting units of each lamp correspond to, wherein the brightness value of the targeted regions are acquired and calculated in a comprehensive manner by the MCUs of the light collecting units, so that the intensity of the light beam of each light emitting unit is determined respectively.

3. The intelligent illuminating device as claimed in claim 1, wherein the light collecting unit further has a buffering unit; the buffering unit has a predefined buffered time threshold; when the brightness level of the targeted region changes within one time period which is below said predefined buffered time threshold, the light collecting unit commands the light emitting unit not to start the adjustment of the intensity of the lamp via the MCU and the PWM unit;
    wherein when the brightness level of the targeted region changes in another time period which is above said predefined buffered time threshold, the light collecting unit commands the light emitting unit to start the adjustment of the intensity of the lamp via the MCU and the PWM unit.

4. The intelligent illuminating device as claimed in claim 1, wherein the lamp has a reflecting curved surface defined therein; the light emitting unit is assembled on an inner surface of the reflecting curved surface, so that the light beam of the light emitting unit is reflected by the reflecting curved surface and is projected out from the lamp toward the direction.

5. The intelligent illuminating device as claimed in claim 1, wherein the collecting direction of the light collecting unit is adjustable, so that the position of the targeted region is shifted according to the collecting direction of the light collecting unit.

6. The intelligent illuminating device as claimed in claim 1, wherein the present invention has a photo sensitive semiconductor unit.

7. The intelligent illuminating device as claimed in claim 1, wherein the lamp has an adjusting unit connecting with the MCU; the adjusting unit provides a manual adjusting manner of the intensity of the light emitting unit of the lamp, so that the intensity of the light emitting unit is adjusted via the manual adjusting manner.

* * * * *